Jan. 25, 1966   C. E. PRICE ETAL   3,231,401
REFRACTORY COMPOSITION
Filed June 22, 1964
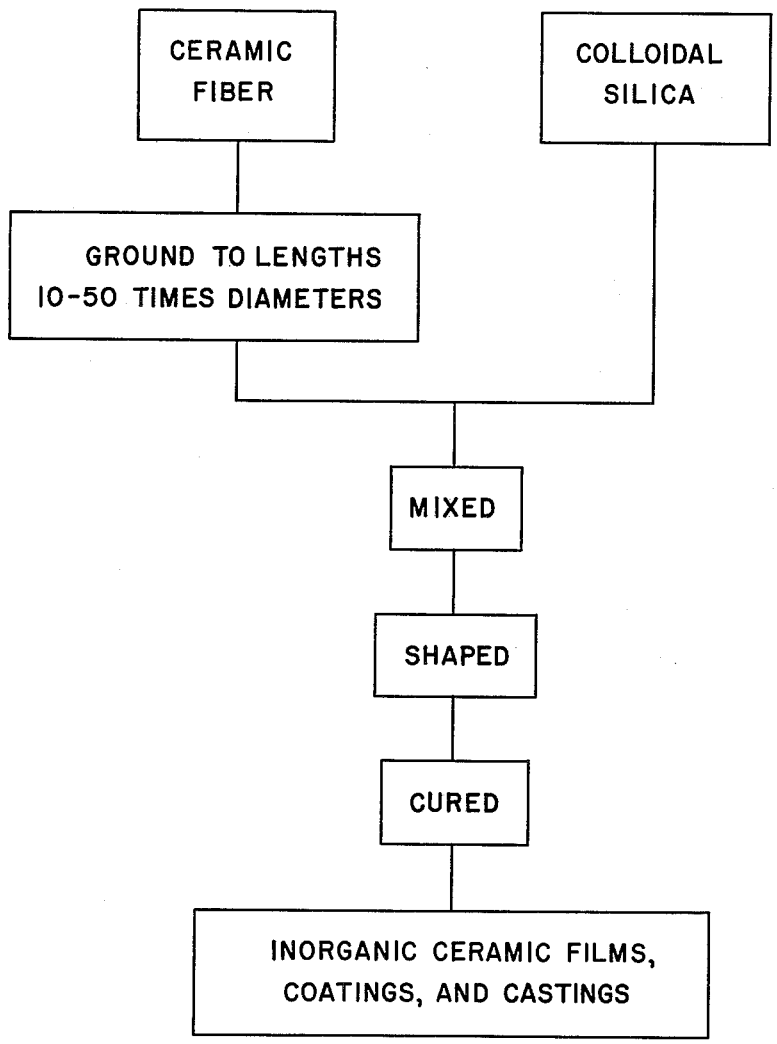
INVENTORS
CLAIR E. PRICE
CLAIRE B. WALWORTH
BY
ATTORNEY United States Patent Office 3,231,401
Patented Jan. 25, 1966

3,231,401
REFRACTORY COMPOSITION
Clair E. Price, Niagara Falls, N.Y., and Claire B. Walworth, Monroeville, Pa., assignors to The Carborundum Company, Niagara Falls, N.Y., a corporation of Delaware
Filed June 22, 1964, Ser. No. 380,973
12 Claims. (Cl. 106—57)

This application is a continuation-in-part of application Serial No. 713,006, filed February 3, 1958, and now abandoned.

This invention relates to a refractory composition capable of withstanding exposure to high temperatures. The composition of this invention can be used as coating or bonding material, can be used to form shapes, can be cast to form bodies, or can be spread, brushed, sprayed, coated or trowelled on many materials to form high strength bodies in substantially any shape and size desired.

Ceramic materials that have highly desirable refractory properties have become available in recent years in the form of fibers, paper, insulating blocks, blankets, and woven fabrics. However, high temperature applications have been limited in many cases because of the lack of a satisfactory binder that could be used to bond and retain the ceramic materials in a desired shape. Organic binders are unsatisfactory for high temperature applications because they carbonize, volatilize, or burn. Satisfactory inorganic binders have not been available. There has also been a need for a material capable of protecting metals, graphite components and other structures which are subjected to high temperatures, molten metals, and the like.

An object of the present invention is to provide a refractory composition capable of withstanding exposure to high temperatures.

Another object of the invention is to provide an easily-worked inorganic refractory composition, such as, for example, one that can be cast, spread, brushed, sprayed, or trowelled, and that will set readily to form high strength bodies in substantially any shape and size desired.

Another object of the invention is to provide an inorganic cement or binder that is characterized by high adhesion to objects and surfaces of all types, even at elevated temperatures.

A further object of the invention is to provide a moldable refractory composition that has exceptional insulating characteristics and that is resistant to thermal shock. A related object of the invention is to provide a refractory composition of the character described that can be cast to form shapes.

Still another object of the invention is to provide a refractory composition that can be used as a coating cement for the protection of a variety of metals, graphite components and refractory bodies.

Various other objects and advantages will appear from the following description of several embodiments of the invention, and the novel features will be particularly pointed out in connection with the appended claims.

The novel refractory composition of the present invention comprises a mixture of fibers of ceramic character, having a carefully controlled length to diameter ratio, and an air-setting, temperature-resistant inorganic binder. In general, the refractory composition of this invention comprises a mixture of inorganic ceramic fibers that have been reduced in length so that the fibers have a length to diameter ratio of between about 10:1 to about 50:1, with at least sufficient aqueous colloidal inorganic oxide to wet all of the fibers. The term "ceramic" is used herein to refer to inorganic material such as, for example, silica, glass, mineral wool, quartz, silicates such as aluminum silicate, and the like.

It has been discovered that when ceramic fiber, such as aluminum silicate fiber and the like, are reduced in length so that the fiber has a length to diameter ratio of between 10:1 to 50:1, and the short fibers thus formed are mixed with an aqueous dispersion of a colloidal inorganic oxide, such as colloidal silica, the resulting composition unexpectedly is extremely cementitious in nature, adhering with a good bond to practically all known substances. It has been discovered that this novel composition is exceptionally well suited for use as a coating cement on a wide variety of porous and non-porous materials including metals, graphite and refractories. When used in this manner it provides a thermal shock-resistant, insulating coating capable of withstanding continuous exposure to temperature of 2300° F. and higher. It was found that the coating cement unexpectedly increases in strength after exposure to high temperatures, developing a ceramic bond at temperatures of 1600° F., and higher.

Also, it has been discovered that due to its cementitious characteristics this refractory composition was extremely useful as an adhesive or binder especially for high temperature applications.

When used as a cement-coating or as an adhesive, this novel composition can be applied to substantially any desired surface by standard spraying, brushing, dipping or trowelling techniques. It can also be cast to form bodies or can be shaped to form rigid, lightweight structures that have excellent erosion resistance even under the direct attack of an open flame. It can be dried slowly at room temperature, or it can be oven dried at moderate temperatures to remove water and cure the composition.

At the present time it is not fully understood why the cementitious composition of this invention has the high adherence, good physical properties after curing, and other desirable characteristics that it possesses. It appears that surface energy forces are available from the ceramic fiber. These same surface energy forces should be available in all ceramic fibers, or at least, in all inorganic siliceous ceramic fibers, such as, for example, silica fibers, asbestos fibers, glass fibers, mineral wool, and quartz fibers, and the available evidence indicates that this is the case as will be described in more detail below. It is believed that the surface forces that are available from the ceramic fibers combine with the surface forces available from the colloidal inorganic oxide to provide the advantageous characteristics of the composition of this invention.

To form the novel composition of this invention, ceramic fibers are reduced in length, such as by grinding in a ball mill, until the fibers have a length to diameter ratio predominantly in the range of from about 10:1 to about 50:1. When this length to diameter ratio is obtained, the short fibers are mixed with an aqueous dispersion of a colloidal inorganic oxide, sufficient oxide being used to provide an oxide content of from about 3 percent to about 40 percent by weight of the mixture on a dry basis. This mixture, which is cementitious, may then be used as a surface coating, as an adhesive, can be cast in a mold or can be mixed with other materials as a binder. As the composition is dried, it hardens and develops considerable strength.

The dried (cured) compositions form homogeneous, monolithic bodies or coatings, that are readily distinguishable from bonded masses of long fiber, reinforced plastics, and the like, because of their physical properties, refractory nature, and appearance.

The drawing indicates schematically the process of one embodiment of the invention that includes grinding inorganic, siliceous ceramic fibers to a controlled length to diameter ratio, mixing the ground fiber with colloidal silica, shaping and curing.

As noted above, inorganic siliceous ceramic fibers, such as silica fibers, asbestos fibers, glass fibers, mineral wool, quartz fibers, silicate fibers, and the like may be used in forming the composition of this invention. Due to its excellent thermal characteristics and refractory properties, a preferred material for use in this invention is aluminum silicate fiber such as the fiber sold by The Carborundum Company of Niagara Falls, New York, under the trademark Fiberfrax®. Such fiber consists of approximately equal parts of alumina and silica together with small amounts of boric oxide, zirconia or other fluxes. This fiber is formed from a mixture of aluminum oxide and silica melted above 3200° F., in an electric arc furnace. The molten mix is transformed into fibers by blowing with steam or air or by spinning from mechanical rotors. U.S. Patent No. 2,557,834 to J. C. McMullen discloses one method in which such aluminum silicate fiber may be made.

Aluminum silicate ceramic fibers are available as short staple fibers and as long staple fibers. Short staple aluminum silicate ceramic fibers are up to approximately 1½ inches in length and have a mean diameter of about 2.5 microns with the fiber diameter ranging from slightly under one micron up to ten microns. The fiber has a specific gravity of about 2.73 gm./cc. and has a melting point of above 3200° F. The short staple fiber has a length to diameter ratio of more than about 100:1. Long staple aluminum silicate such as, for example, Fiberfrax® long staple ceramic fiber, consisting of about 51.3 percent alumina, about 45.3 percent silica and about 3.4 percent zirconia, has a fiber length ranging from about 1 inch to about 10 inches. The mean fiber diameter of this long staple fiber varies according to the grade of fiber selected and ranges from about 4 microns to about 20 microns. Thus, "fine" long staple fiber has a mean diameter of about 4 microns, with a minimum diameter of about 2 microns and a maximum diameter of about 40 microns; the fiber diameters are predominantly in the range between 4 and 8 microns; "medium" grade long staple fiber has a mean diameter of about 10 microns with the fiber diameters predominantly in the range between 8 and 14 microns. "Coarse" fibers have a mean diameter of about 20 microns with minimum and maximum fiber diameters of about 4 and 80 microns, respectively.

This inorganic ceramic fibrous material, as blown or otherwise fabricated, contains a large proportion of pellets or otherwise extraneous or non-fibrous matter. Thus the fibrous product as produced contains from about 25 percent to about 45 percent by weight of fibers. The balance is in the form of pellets or otherwise extraneous or non-fibrous material that is intermixed with the fibers and resembles small grains of sand. This non-fibrous material or pellets have the same composition as the fiber and is often attached to individual fibers. Usually, a maximum of about 35 percent to about 42 percent of the aluminum silicate fiber, as blown or spun, is in fibrous form.

In accordance with the present invention, the non-fiberized material may be separated from the fibers so that the refractory composition contains, in addition to the colloidal inorganic oxide, only fibrous material of controlled length to diameter ratio. Alternatively, it is also within the scope of the present invention to include in the composition the non-fiberized material. Also, it is within the scope of the present invention to include in the composition controlled amounts of short staple ceramic fiber, which has not been reduced in length. This is particularly useful in extending the mix when the composition is used to form shaped bodies or is cast. While the non-fibrous material and the short staple fiber may be used in forming the novel composition of this invention, the mix must still contain, in addition to the colloidal inorganic oxide, the ceramic fibers which have a length to diameter ratio of between 10:1 to 50:1. It is the presence of these fibers of controlled length to diameter ratio in the mix which imparts to the composition the unique characteristics described above.

When the inorganic ceramic fiber has been reduced in length, such as by ball milling, to a length to diameter ratio of between 10:1 to 50:1, the ground fiber is then combined with an aqueous dispersion of a colloidal inorganic oxide to form the novel composition of this invention.

Suitable inorganic oxides which may be used in forming the novel composition of this invention include colloidal silica, colloidal zirconia and colloidal alumina. Each of these colloids exhibits surface forces which may combine with the surface forces available from the inorganic fiber. Usually it is preferred to use an aqueous dispersion of colloidal silica, due to its ready availability. In general, the aqueous colloidal silica dispersions that can be used are prepared by following the teachings of the Bird Patent 2,244,325, i.e., sodium silicate solution is passed through an acid-regenerated ion exchange resin, to remove the sodium ions from the silicate and replace them with hydrogen ions. The effluent from the ion exchanger may be evaporated to obtain the desired silica content. The characteristics of several satisfactory stable aqueous dispersions of colloidal silica are described in "The Colloidal Chemistry of Silica and Silicates," by Ralph K. Iler, Cornell University Press, Ithaca, New York, 1955.

Aqueous dispersions of colloidal silica at concentrations of silica in the range between 1 percent and 30 percent by weight can be used with effective results. However, the concentrated dispersions are preferred because less water need be removed in curing. Usually the silica is dispersed in water, but it is contemplated that volatile additives may be employed as part of the dispersing medium, and it is within the contemplation of the present invention that dispersions of silica in any suitable medium may be employed.

A preferred material is colloidal silica sold by the E. I. du Pont de Nemours and Company, Inc., Wilmington, Delaware, under the trademark "LUDOX" HS. "LUDOX" HS is an aqueous colloidal sol containing about 30 percent by weight of the dispersion as silica, the colloidal silica having an approximate particle size of about 15 millimicrons. It has a viscosity at 25° C. of 3.6 cps., and a pH at 25° C. of 9.8. While the specification will be primarily concerned with the use of an aqueous dispersion of colloidal silica as the inorganic oxide in the composition, it is to be remembered that other colloidal inorganic oxides, such as colloidal zirconia and colloidal alumina, may also be used in equivalent amounts.

The amount of the aqueous colloidal inorganic oxide used in forming the composition must be sufficient to provide at least about 3 percent by weight of the oxide derived from the colloidal oxide on a dry basis. When the composition contains less than about 3 percent by weight, dry weight basis, of the oxide derived from the colloidal oxide, bodies made from such a composition contain so little oxide that they may not be self-sustaining. The composition may contain up to about 40 percent by weight, dry weight basis, of oxide derived from the colloidal oxide. Optimum results and excellent physical characteristics are obtained when the oxide content, dry weight basis, derived from the colloidal oxide, of the composition is on the order of about 10 percent. When sufficient colloidal silica is added to the fibrous material to form a pasty mass, the amount of silica on a dry weight basis in the cured body usually will be about 10 percent to about 15 percent by weight of silica derived from the colloidal silica.

In curing the compositions, it is generally preferred to drive off the water by heating in an oven at a temperature of about 200° F. This is an expedient for effecting a rapid cure. Room temperature curing is equally as effective but requires longer periods of time. Conditions that would cause the rapid evolution of water during curing are to be avoided so that porous structures are not produced. However, for many applications, the porosity of the structure is not important, and in such cases, curing temperatures up to about 2000° F. can be used. In some cases, high temperature cures can be effected under "flash" drying conditions.

The following specific examples describe the manner in which the novel composition of the present invention can be prepared and used. These examples are given for illustrative purposes only, it not being intended to limit the invention to the specific proportions and uses set forth below.

EXAMPLE I

One hundred pounds of short staple aluminum silicate ceramic fiber, having a mean diameter of 2.5 microns, a fiber length up to approximately 1½ inches and containing non-fiberized particles, was placed in a production sized ball mill, together with porcelain balls. The ball mill was first operated for about ten minutes to distribute the fiber within the mill and the mill was then operated for an additional ten minutes and the ground fibers then removed. The non-fiberized material was then separated from the fibers by screening the material obtained from the ball mill on a 50 mesh steel-wire cloth screen, which had openings that ranged in width from about 0.254 mm. to about 0.305 mm. The fibers exhibited a felting action on the screen and thus, fibers were retained on the screen that had much smaller lengths than the screen openings. The material that remained on the screen was essentially fibrous in character and the material that passed through the screen was non-fibrous. The fibrous material remaining on the screen was recovered for use. About 26 percent of the ground material removed from the ball mill was pure fiber, the balance being non-fibrous. Examination of the fibers revealed that the milling operation did not change the diameter of the original fibers, but that it did reduce the length of the fibers to between 10 and 50 times the fiber diameter. Thus, when the short staple fiber was milled the fibrous material removed from the mill had the same fiber diameter as the fibrous material that was placed in the mill, i.e., a mean diameter of 2.5 microns with a diameter range of from slightly under one micron up to about 10 microns.

The short fibers that remained on the screen were removed and mixed with an aqueous dispersion of colloidal silica, the aqueous dispersion containing about 30 percent by weight silica. A sufficient amount of the aqueous dispersion was added to form a composition containing, on a dry weight basis, about 10 percent by weight of silica derived from the aqueous dispersion.

A portion of the wet mixture of colloidal silica and ball milled and screened aluminum silicate fiber was cast to form a large, generally cylindrical roller. The casting was dried in an oven at about 200° F. This roller is adapted for sealing together the two glass panes of double-paned windows, by pressing together their heat-softened edges. Because of its refractory characteristics, this roller is ideally suited for this purpose.

Since the roller is made from aluminum silicate and silica, it can withstand exposure to temperatures of 2300° F. for short periods, and prolonged exposure to temperatures of 2000° F. At temperatures over 2000° F., aluminum silicate gradually changes from its amorphous glassy structure to a crystalline structure, and the effect of crystallization or "devitrification" is to make the structure more brittle. In the temperature range below 1800° F., the material is substantially unaffected even by very long exposure.

EXAMPLE II

Another batch of short staple aluminum silicate ceramic fibrous material, consisting of approximately equal parts by weight of alumina and silica and containing fibers having a mean fiber diameter of about 2.5 microns, a fiber length of up to 1½ inches and also containing non-fiberized particles, was placed in a ball mill. The mill was a 4' x 4' Abbey mill that contained 600 lbs. of porcelain balls that had a diameter of about 3 inches. The mill was operated for about 10 minutes to distribute the fiber evenly throughout the mill, and thereafter, the mill was operated for an additional period of about 25 minutes.

The ground fiber was then removed from the mill. A substantial portion of the milled fiber was in the form of non-fibrous particles that had separated from the fiber during milling. Examination of a portion of the ground fiber revealed that the mean fiber diameter was not reduced by the ball milling, but that the length to diameter ratio of the ground fiber was in the range of from about 10:1 to about 50:1. The milled fiber was not screened, but was placed in a mixer and was mixed with an aqueous dispersion of colloidal silica, the dispersion containing about 30 percent by weight silica. Sufficient colloidal silica was added to the milled fibers to form a composition that contained, on a dry weight basis, about 10 percent by weight of silica derived from the colloidal silica.

This composition was extremely cementitious and was found to be capable of forming very smooth, strong coatings. When this composition was brushed on the lining of a high temperature furnace and dried it formed a strong protective coating which helped prevent spalling of the underlying material due to its insulating efficiency and resistance to thermal shock.

As noted above, larger amounts of colloidal silica may be used in forming the novel refractory composition of this invention. For example, an excellent cementitious composition has been made by mixing sufficient colloidal silica with the ceramic fibrous material described above (i.e., containing both ground short fibers having a length to diameter ratio of between 10:1 and 50:1 and non-fibrous material) so that the composition contains, on a dry basis, about 24 percent silica derived from the colloidal silica. This composition has been used to coat graphite rods thereby forming on the rods a strong smooth coating protecting the rods against the effects of high temperature environments and excessive thermal shock conditions. Suitable compositions may be prepared in the same manner containing, on a dry weight basis, up to 40 percent by weight of silica, derived from the colloidal silica.

EXAMPLE III

Conventional short staple ceramic fiber, which has not been reduced in length, may be incorporated in the composition. Thus, a series of boards was prepared from compositions in which varying amounts of short staple ceramic fiber were incorporated in the composition containing the ground fibers and colloidal silica. In preparing each board a batch of aluminum silicate ceramic fiber was ball milled and screened, as in Example I, to reduce the fibers to a length to diameter ratio of between 10:1 and 50:1 and to remove the non-fiberized material. To these ground fibers was added sufficient short staple aluminum silicate fiber so that the total amount of fiber from all sources was 100 grams, dry weight basis. For the purpose of computing the total amount of fiber from all sources, the ground fibers were considered to be 100 percent fiber and the short staple fiber was considered to be 75 percent fiber. In each case, the dry fibrous material was mixed to make it homogeneous, and an aqueous dispersion of colloidal silica containing 30 percent by weight silica was then added until a thick pasty mixture was obtained. This mixture was then placed in a 6" x 6" form, was blown fairly dry, and was then pressed to obtain a minimum thickness. Excess aqueous colloidal silica or water was permitted to escape freely when the mixture was pressed. After pressing, the material was permitted to dry in an oven at about 200° F.

The results obtained from the preparation and testing of these boards are summarized in Table 1 below.

across two supports, and the load at the break point was recorded. The modulus of rupture was then computed Table 1

| Specimen No. | Ground and screened fiber (gms.) | Short staple ceramic fiber (gms.) | Dry board weight (gms.) | Board thickness (inches) | Actual density (lbs./ft.$^3$) | Fiber density (lbs./ft.$^3$) | Modulus of rupture (p.s.i.) |
|---|---|---|---|---|---|---|---|
| 1 | 50 | 50 | 147.0 | 0.347 | 44.7 | 11.4 | 308 |
| 2 | 75 | 25 | 129.9 | 0.290 | 47.0 | 31.6 | 308 |
| 3 | 90 | 10 | 111.3 | 0.217 | 54.4 | 46.3 | 325 |

The data in Table 1 leads to several observations: as the proportion of ground and screened fiber in the mixture increased, the thickness of the board decreased and its density increased, the need for the binder decreased, the silica retention decreased, and there was a tendency for the modulus of rupture to increase.

All of the board specimens that were prepared as described above were subjected to thermal shock test by heating to 2000° F., and immediately dropping in cold water. No damage to any specimen was observed.

in the conventional way. The results of this test are reported in Table 2 which represents an average value obtained from tests on four specimens. In Table 2 the designation "fibrous" refers to the ground fibrous material obtained from the ball mill including the short fibers having a length to diameter ratio of between 10:1 and 50:1, and the non-fibrous material. The designation "staple" refers to short staple aluminum silicate fibers having a mean diameter of 2.5 microns and lengths up to 1½".

Table 2

| Specimen No. | Dry mix | Percent SiO$_2$, dry weight basis | MOR at room Temp. (p.s.i.) | MOR at 1,000° C. (p.s.i.) | Percent linear shrinkage |
|---|---|---|---|---|---|
| 1 | 90% fibrous / 10% staple | 13.0 | 300 | 300 | 3.50 |
| 2 | 75% fibrous / 25% staple | 22.2 | 300 | 310 | 3.79 |
| 3 | 50% fibrous / 50% staple | 38.2 | 300 | 300 | 4.49 |

EXAMPLE IV

Conventional short staple ceramic fiber can also be incorporated in compositions formed from the ground fibrous material from which the non-fiberized material has not been removed, such as, for example, that of Example II. Thus a series of boards was prepared from compositions which contained varying amounts of short staple aluminum silicate fiber, inorganic fibrous material and colloidal silica. In preparing each board a uniform procedure was followed. That is, a batch of short staple aluminum silicate fiber, having a mean diameter of about 2.5 microns, was placed in a ball mill together with porcelain balls. The mill was operated for a 10 minute period to distribute the fiber and the mill was then operated for another 25 minutes at which time the fibrous material was removed from the mill. A substantial portion of the ground, milled fiber was in the form of non-fibrous particles or pellets that had separated from the fiber during milling. It was noted that the milling operation apparently did not change the diameter of the original fibers. Thus, the fibrous material removed from the mill had the same fiber diameter as the fibrous material placed in the mill. However, the milling operation did reduce the fiber length so that the fibrous material removed from the mill had a length to diameter ratio of between about 10:1 to 50:1.

This fibrous material containing both the short fibers and non-fibrous material was then mixed with varying amounts of conventional short staple aluminum silicate fiber. An aqueous dispersion of colloidal silica, containing 30 percent silica, was then mixed with the dry fibrous material. After thorough mixing, the mixture was poured into molds that had the dimensions 4" x 4" x ½". The cast pieces were dried in an oven at 200° F. The surfaces of the pieces were then ground to reduce the thickness of the specimens to ¼" and to produce two parallel surfaces. The ground pieces were then cut to specimens 3" x ½" x ¼" in size for testing.

The specimens were then tested to determine modulus of rupture at room temperature and at 1000° C. In making the modulus of rupture test, the test sample was placed When more than 50 percent by weight of the dry mix, of short staple fiber is used, there is a drainage problem since a large quantity of aqueous colloidal silica must be used to get good castings; and the castings exhibit decreased strength.

EXAMPLE V

While the examples have been primarily concerned with refractory compositions formed of aluminum silicate fiber, it is to be understood that the composition of this invention may be formed from other inorganic siliceous ceramic materials.

For example, a 1200° glass ("E" glass) was obtained in the form of substantially continuous monofilament material that had a diameter in the range between about 10 microns and about 30 microns. This was ground in a ball mill to form short fibers that had lengths that were predominantly in the range between about ten times and about fifty times their diameters. The short fibers were combined with an aqueous dispersion of colloidal silica, the dispersion containing about 30 percent SiO$_2$. Sufficient colloidal silica was added to form a composition that contained, on a dry basis, between 10 percent and 15 percent by weight of silica derived from the colloidal silica. This composition is very similar in its characteristics to the compositions already described and can be employed as a coating, for casting, and the like. Bodies made from this type of composition are not as refractory as those made from compositions containing aluminum silicate fibers.

Substantially pure silica fiber is also available and has excellent refractory and thermal insulating characteristics. Fiber of this type that contains 96 percent to 98 percent by weight of pure silica can be obtained from glass fiber by leaching. A cementitious, castable composition was made by mixing an aqueous dispersion of colloidal silica, containing about 30 percent SiO$_2$, with ground silica fiber of this type, employing sufficient colloidal silica to make the composition contain, on the dry weight basis, between about 10 percent and about 15 percent by weight of silica derived from the colloidal silica. Bodies cast from this composition had relatively low strength characteristics because the fibers themselves were not strong. This is probably attributable to the fact that they were obtained by a leaching process.

In a substantially similar manner, ground asbestos fibers that have a length in the range between ten times and about fifty times their diameter, were mixed with colloidal silica to form castable compositions. These compositions had highly desirable properties but were somewhat inferior to bodies made from ground aluminum silicate fiber in their refractory characteristics and mechanical properties.

EXAMPLE VI

In addition to the inorganic ceramic fibrous material and the colloidal silica, the refractory compositions of this invention may also contain a suspension or thickening agent. The addition of the suspension agent to the colloidal silica-ground ceramic fiber mixture prevents the ground fiber from settling and hardening prematurely. The addition of the suspension agent also affects the viscosity of the resulting composition so that by controlling the amount of water and suspension agent in the mixture, the mixture may have a viscosity suitable for trowelling, spraying, dipping or brushing applications. This composition is extremely cementitious and may be used as a coating-cement on a broad variety of porous or non-porous materials, including metals, graphite and refractories, or it may be used as a cement to unite materials having the same or different characteristics. Bentonite clay has been found to be especially well suited as a suspension agent, but other conventional suspension or thickening agents may be used. A preferred material is "Veegum T," a magnesium-aluminum silicate sold by the R. T. Vanderbilt Company, Inc.

Refractory compositions of this character have been prepared in the following manner. A batch of short staple aluminum silicate fiber, having a mean diameter of about 2.5 microns, was ball milled to reduce the fiber to a length to diameter ratio of between about 10:1 to about 50:1, according to the procedure set forth in Example II. The ground fiber, containing non-fiberized material, was removed from the mill and mixed with an aqueous dispersion of colloidal silica, the dispersion containing about 30 percent silica. Sufficient colloidal silica was added so that the composition contained, on a dry weight basis, about 13 percent by weight $SiO_2$ derived from the colloidal silica. About 1.5 percent by weight on a dry weight basis of bentonite clay was added to the colloidal silica-ground fiber mixture to form a composition having a solids content of about 77 percent and a weight of 15 pounds per gallon. This composition was very cementitious in nature and had a viscosity which made it suitable for trowelling applications. A composition having a viscosity suitable for spraying, brushing and dipping applications has been made from a mixture which consisted essentially of, on a dry weight basis, about 3 percent silica, derived from the colloidal silica, about 3 percent bentonite clay and the balance being inorganic ceramic fibrous material including ground short fibers having a length to diameter ratio between 10:1 and 50:1 together with non-fibrous material. It has been found that up to 3 percent by weight on a dry weight basis of the suspension agent may be added to the mix, depending on the viscosity desired.

These cementitious compositions were applied as a thin external coating to a graphite pipe. They formed hard, refractory coatings having an excellent bond to the graphite pipe. Graphite pipes of this type are sometimes used, for example, to pass gaseous chlorine into molten aluminum, and severe oxidation of the graphite pipe usually occurs at the surface of the molten aluminum where the graphite is exposed to air, and where the chlorine enters the molten aluminum, since an exothermic reaction occurs. Graphite tubes that have a cured coating, formed by spraying, dipping, or otherwise applying and curing the cementitious compositions that are described above, have a much longer life expectancy for this same application because the coating insulates and protects the graphite tube. The coating is not wet by molten aluminum, and is much lighter than molten aluminum so that if any portions of the coating are broken off the tube for any reason, they will float and will not contaminate the aluminum.

The cement was also used to unite parts of a high temperature filter. The structural elements and the filter elements of the filter were entirely constructed, respectively, from board and paper made of aluminum silicate fiber. The filter elements were cemented in place to the frame structure with this cement. The cement was cured by drying in an oven at about 200° F. The filter was outstandingly useful at very high temperatures because the thermal expansion characteristics for all of the parts of the filter were substantially the same.

While the refractory composition of this invention has been described above as containing non-fibrous material and/or short staple fibers, it must be remembered that the composition must contain the short fibers having a length to diameter ratio in the range of from about 10:1 to about 50:1. It is the presence of these fibers of controlled length to diameter ratio which imparts to the composition the unique characteristics described above.

While the invention has been described in connection with specific embodiments thereof, it will be understood that it is capable of further modifications and this application is intended to cover any variations, uses of adaptations of the invention following the principles of the invention and including such departures from the present disclosure as come within known or customary practice in the art to which the invention pertains and as may be applied to the essential features hereinbefore set forth or as fall within the scope of the appended claims.

We claim:

1. A refractory composition formed from a substantially homogeneous mixture consisting essentially of the following ingredients, expressed in approximate percentages on a dry weight basis: from 60 percent to 97 percent of said mixture of ground inorganic ceramic fibrous material and a dispersion consisting essentially of a colloidal inorganic oxide selected from the group consisting of silica, zirconia and alumina in sufficient amount that said oxide constitutes from 3 percent to 40 percent of said mixture, said ground fibrous material consisting of short fibers having a mean diameter in the range of from about 2.5 to about 20 microns and a length to diameter ratio in the range of from about 10:1 to about 50:1.

2. A refractory composition formed from a substantially homogeneous mixture consisting essentially of the following ingredients, expressed in approximate percentages on a dry weight basis: 90 percent of said mixture of ground aluminum silicate fibrous material and an aqueous dispersion consisting essentially of colloidal silica in sufficient amount that said silica constitutes 10 percent of said mixture, said ground aluminum silicate fibrous material consisting of short fibers having a mean diameter in the range of from about 2.5 to about 20 microns and a length to diameter ratio in the range of from about 10:1 to about 50:1.

3. A refractory composition formed from a substantially homogeneous mixture consisting essentially of the following ingredients, expressed in approximate percentages on a dry weight basis: from 60 percent to 97 percent of said mixture of ground inorganic ceramic fibrous material and a dispersion consisting essentially of a colloidal inorganic oxide selected from the group consisting of silica, zirconia and alumina in sufficient amount that said oxide constitutes from 3 percent to 40 percent of said mixture, said ground fibrous material consisting of from 25 percent to 100 percent of short fibers having a mean diameter in the range of from about 2.5 microns to about 20 microns and a length to diameter ratio in the range of from about 10:1 to 50:1, and from 0 percent to 75 percent of non-fibrous material, the non-fibrous material having substantially the same chemical composition as the short fibers.

4. A refractory composition formed from a substantially homogeneous mixture consisting essentially of the following ingredients, expressed on a dry weight basis: from 76 percent to 90 percent of said mixture of ground inorganic ceramic fibrous material consisting essentially of aluminum silicate and a dispersion consisting essentially of colloidal silica in sufficient amount that said silica constitutes from 10 percent to 24 percent of said mixture, said ground fibrous material consisting of from 25 percent to 42 percent of short fibers having a mean diameter in the range of from about 2.5 microns to about 20 microns and a length to diameter ratio in the range of from about 10:1 to 50:1, and from 58 percent to 75 percent of non-fibrous particles.

5. A refractory composition formed from a substantially homogeneous mixture consisting essentially of the following ingredients, expressed in approximate percentages on a dry weight basis: from 60 percent to 97 percent of said mixture of inorganic ceramic fibrous material and a dispersion consisting essentially of a colloidal inorganic oxide selected from the group consisting of silica, zirconia and alumina in sufficient amount that said oxide constitutes from 3 percent to 40 percent of said mixture, said ceramic fibrous material consisting of from 50 percent to 90 percent of ground fibrous material and from 10 percent to 50 percent of staple fibrous material, said ground fibrous material consisting of from 25 percent to 100 percent of short fibers having a mean diameter in the range of from about 2.5 microns to about 20 microns and a length to diameter ratio in the range of from about 10:1 to 50:1, and from 0 percent to 75 percent of non-fibrous particles, said staple fibrous material having a mean diameter in the range of from about 2.5 microns to about 20 microns and a length to diameter ratio of more than about 100:1.

6. A refractory composition formed from a substantially homogeneous mixture consisting essentially of the following ingredients, expressed as approximate percentages on a dry weight basis: from 60 percent to 90 percent of said mixture of inorganic ceramic fibrous material consisting essentially of aluminum silicate, and a dispersion of colloidal silica in sufficient amount that said silica constitutes from 10 percent to 40 percent of said mixture, said ceramic fibrous material consisting of from 50 percent to 90 percent of ground fibrous material and from 10 percent to 50 percent of staple fibrous material, said ground fibrous material consisting of short fibers having a mean diameter in the range of from about 2.5 microns to about 20 microns and a length to diameter ratio in the range of from about 10:1 to about 50:1, said staple fibrous material having a mean diameter in the range of from about 2.5 microns to about 20 microns and a length to diameter ratio of more than about 100:1.

7. A refractory composition formed from a substantially homogeneous mixture consisting essentially of the following ingredients, expressed as approximate percentages on a dry weight basis: from 60 percent to 90 percent of said mixture of inorganic ceramic fibrous material consisting essentially of aluminum silicate and a dispersion consisting essentially of colloidal silica in sufficient amount that said silica constitutes from 10 percent to 40 percent of said mixture, said ceramic material consisting of from 50 percent to 90 percent of ground fibrous material and from 10 percent to 50 percent of staple fibrous material, said ground fibrous material consisting of at least 25 percent of short fibers having a mean diameter in the range of from about 2.5 microns to about 20 microns and a length to diameter ratio in the range of from about 10:1 to about 50:1 and less than 75 percent of non-fibrous particles, said staple fibrous material having a mean diameter in the range of from about 2.5 microns to about 20 microns and a length to diameter ratio of more than about 100:1.

8. A refractory composition formed from a substantially homogeneous mixture consisting essentially of the following ingredients, expressed in approximate percentages on a dry weight basis: from 60 percent to 97 percent of said mixture of inorganic ceramic fibrous material, a dispersion consisting essentially of a colloidal inorganic oxide selected from the group consisting of silica, zirconia and alumina in sufficient amount that said oxide constitutes from 3 percent to 40 percent of said mixture and from 0 percent to 3 percent of a suspension agent, said ceramic fibrous material consisting of from 50 percent to 100 percent of ground fibrous material, and from 0 percent to 50 percent of staple fibrous material, said ground fibrous material consisting of at least 25 percent of short fibers having a mean diameter in the range of from about 2.5 microns to about 20 microns and a length to diameter ratio in the range of from about 10:1 to about 50:1, and less than 75 percent of non-fibrous particles, said staple fibrous material having a mean diameter ratio in the range of from about 2.5 microns to about 20 microns and a length to diameter ratio of more than about 100:1.

9. The refractory composition as defined in claim 8 in which said ground fibrous material and said staple fibrous material consist essentially of aluminum silicate, and said dispersion consists essentially of colloidal silica.

10. The refractory composition as defined in claim 9 in which said suspension agent is bentonite clay.

11. A refractory composition formed from a substantially homogeneous mixture consisting essentially of the following ingredients, expressed in approximate percentages on a dry weight basis: from 74 percent to 86 percent of said mixture of ground inorganic ceramic fibrous material consisting essentially of aluminum silicate, a dispersion consisting essentially of colloidal silica in sufficient amount that said silica constitutes from 13 percent to 23 percent of said mixture, and from 1 percent to 3 percent of said mixture, of a suspension agent, said ground fibrous material consisting of at least 25 percent of short fibers having a mean diameter in the range of from about 2.5 microns to about 20 microns and a length to diameter ratio in the range of from about 10:1 to about 50:1, and less than 75 percent of non-fibrous material.

12. The refractory composition as defined in claim 11 in which said suspension agent is bentonite clay.

References Cited by the Examiner
UNITED STATES PATENTS

| | | | |
|---|---|---|---|
| 2,808,338 | 10/1957 | Bruno et al. | 106—69 |
| 2,811,457 | 10/1957 | Speil et al. | 106—57 |
| 3,077,413 | 2/1963 | Campbell | 106—69 |

TOBIAS E. LEVOW, *Primary Examiner.*